United States Patent Office 2,694,930
Patented Nov. 23, 1954

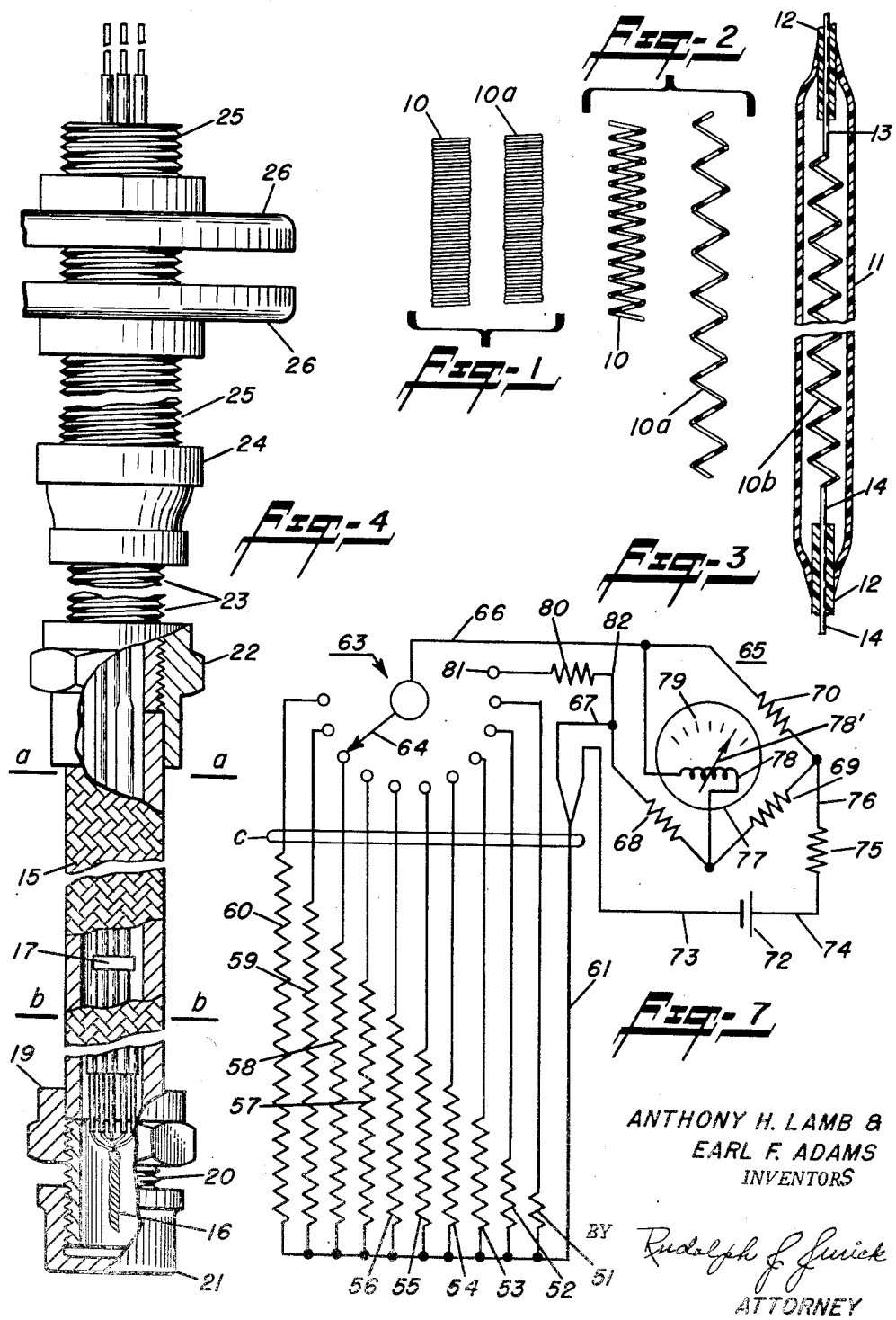

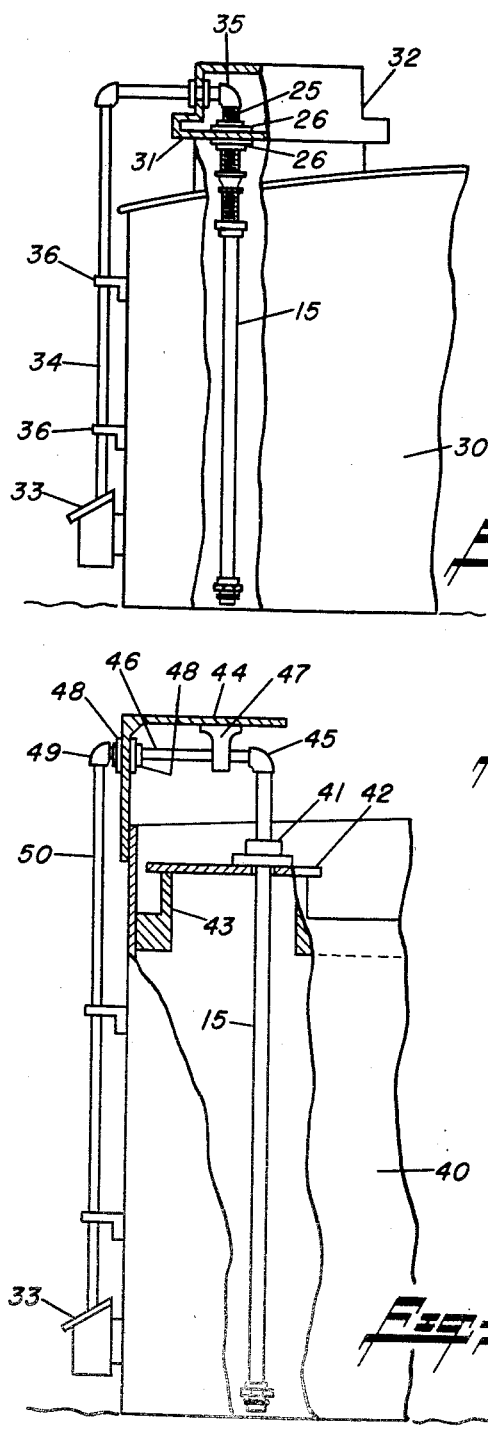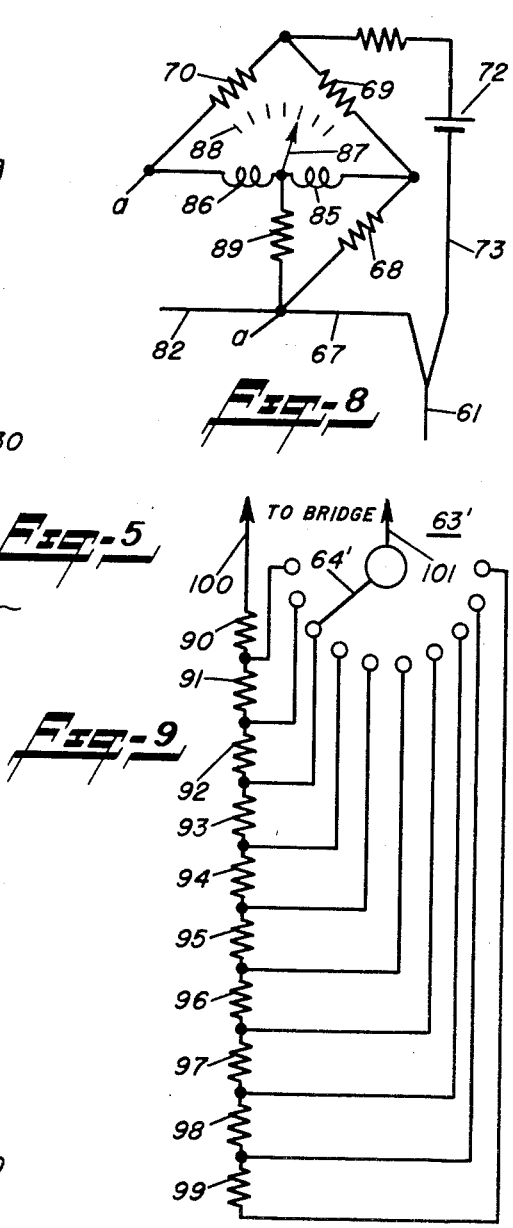

2,694,930

TEMPERATURE MEASURING APPARATUS

Anthony H. Lamb, Hillside, and Earl F. Adams, Union, N. J., assignors to Weston Electrical Instrument Corporation, Newark, N. J., a corporation of New Jersey Application June 22, 1950, Serial No. 169,704

14 Claims. (Cl. 73—362)

This invention relates to temperature measuring apparatus and more particularly to a novel arrangement for the measurement of the average temperature of a liquid.

Our invention will be described with specific reference to the measurement of the average temperature of petroleum products contained in a storage tank, but it will be apparent the features of the invention are equally adapted for the measurement of the temperature of other liquids in other containers such as barges, tank cars, tank trucks, etc.

In oil storage tanks it is necessary to know the average temperature of the oil at any specific level thereof. It is known that the volume of such liquid varies with temperature and that available metering apparatus does not include automatic means compensating for temperature changes. Such metering apparatus is calibrated at a standard, or base, temperature usually 60° F. Consequently, unless allowance is made for the actual temperature of the oil at the time of metering, a loss accrues to the seller if the temperature of the oil is below 60° F. and, on the other hand, such loss befalls the purchaser if the actual temperature of the oil is above this temperature. Inasmuch as the temperature of oil within a storage tank varies at different levels, an accurate determination of the average temperature requires an averaging of the various temperatures throughout the entire depth of the oil. Further, the actual depth of the oil varies from time to time, thereby complicating such temperature measurement. To date no simple and satisfactory apparatus is available for this purpose.

An object of this invention is the provision of apparatus for the measurement of the average temperature of a liquid.

An object of this invention is the provision of an electrical resistance thermometer for the measurement of the average temperature of a liquid for any predetermined depth of the liquid.

An object of this invention is the provision of temperature measuring apparatus comprising a plurality of resistance coils of different lengths, means impressing an electrical potential across a selected coil, and temperature-indicating means responsive to the change in the ohmic resistance of the coil.

An object of this invention is the provision of electrical temperature measuring apparatus comprising a series of individual resistance coils of different lengths and predetermined ohmic resistance, a casing around each coil, a fluid-tight housing around the encased coils, means for attaching the housing to a liquid-containing compartment and temperature-indicating means responsive to the instantaneous ohmic resistance of a selected coil.

An object of this invention is the provision of apparatus for the measurement of the average temperature of a liquid for a predetermined depth thereof, said apparatus comprising a tubular housing extending through the depth of the liquid, a series of helically-wound resistance coils within the housing, said coils being wound of wires having a uniform length and ohmic resistance and each having one end disposed at one end of the housing, means retaining each coil at a predetermined, coiled length, means impressing an electrical potential across a selected coil, and means responsive to the current flow in such selected coil for indicating the average temperature of the liquid throughout a depth corresponding substantially to the coiled length of such selected coil.

An object of this invention is the provision of a flexible resistance bulb for use with electrical temperature-measuring apparatus.

An object of this invention is the provision of a flexible resistance bulb comprising a coil of resistance wire, a flexible housing around the coil, said housing being closed at each end, and connection leads extending from each end of the housing, the said coil having an end connected to each lead.

An object of this invention is the provision of a temperature-sensitive resistance element comprising a helically-wound coil of wire, a tubular housing around the coil, insulated connection leads extending from each end of the housing, said coil having its ends connected to the leads, and the ends of the housing being heat-sealed to the insulation on the connection leads.

These and other objects and advantages will become apparent from the following detailed description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 illustrates two resistance coils of the type used in our invention, each coil being formed into a helix from wires of uniform length and equal ohmic resistance;

Figure 2 illustrates the coils stretched axially to different, coiled lengths;

Figure 3 is a cross-sectional view showing the helically-wound resistance coil disposed within a plastic tube;

Figure 4 illustrates a complete, temperature-sensing unit comprising a tubular, liquid-tight housing within which a series of elements, such as shown in Figure 3, are disposed, said unit including means for suspending same from the top of a fluid-storage tank;

Figure 5 is a fragmentary view illustrating the temperature-sensing unit of Figure 4, attached to a cone-roof type of fluid-storage tank;

Figure 6 is a fragmentary view illustrating the temperature-sensing unit of Figure 4, attached to a cone-roof type of fluid-storage tank;

Figure 6 is a fragmentary view illustrating the temperature-sensing unit attached to a floating-roof type of fluid-storage tank;

Figure 7 is a diagram of an electrical circuit for providing temperature indications in conformity with the ohmic value of a selected resistance coil;

Figure 8 is a fragmentary diagram of a circuit employing a ratio meter for temperature indications; and Figure 9 is a diagrammatic representation of another arrangement of the resistance coils.

The temperature-sensitive resistance coils made in accordance with our invention comprise individual coils each having a uniformly distributed resistance throughout its length, the length of each coil being determined by the height (depth) of the fluid to be measured. For varying levels of the fluid we employ a series of such resistance coils of different lengths, but of predetermined ohmic resistance, each coil arranged for selective connection to a Wheatstone bridge circuit.

In the case of a fluid-storage tank designed for a maximum contained level of forty (40) feet, it has been determined that average temperature readings taken at levels in steps of four (4) feet is sufficiently close for practical purposes. To meet such requirement we provide 10 resistance coils extending vertically from the bottom of the tank, said coils being disposed parallel to each other and varying in length progressively from 4 to 40 feet, that is, 4, 8, 12 . . . 40 feet.

Figure 1 illustrates two (2) such resistance coils 10, 10a, said coils being wound in a helix from equal lengths of wire having a relatively high temperature coefficient of resistance. These coils are then stretched axially to predetermined lengths as shown in Figure 2. It will be apparent that while the axial length of the coils is different, each coil has the identical ohmic resistance and, therefore, one coil may be substituted for the other in a Wheatstone bridge circuit for the measurement of temperature. Ten (10) such coils having coiled lengths of 4, 8, 12 . . . 40 feet are employed in the case of a 40 foot storage tank, mentioned above. The wire of which the individual coils are formed may be insulated, as with a Formex covering, or the wire may be bare as each coil is encased within a protective housing.

While the drawings illustrate helically-wound coils, it will be apparent the coils need not be limited to this particular form. For example, the coils may comprise a round wire, or a flat ribbon, folded back and forth upon itself as a pleat.

Referring now to Figure 3, each coil, 10b, is enclosed within a tubular housing 11 made of a flexible material such as Vinylite plastic. Each end of the housing is heat-sealed or cemented to the plastic insulation covering 12 of the relatively heavy, copper lead wires 13, 14. As shown in the drawing, the inner end of each lead wire is soldered to the coil ends, the wire insulation 12 being stripped from the wire for this purpose. The length of the tubular housing 11 is such that the helical coil contained therein has the desired axial length. It will be noted this construction results in a flexible, sealed resistance element protected against mechanical and chemical damage.

A set of ten (10) such resistance elements, each of different length, are arranged side by side and inserted into a flexible metallic hose 15, as shown in Figure 4. The lower ends of the elements are connected together electrically, as indicated by the joint 16, it being pointed out that the lower ends of each element, and of the resistance coil contained therein, are disposed substantially in a common plane at the lower end of the flexible hose. The lead wires from the upper end of each element pass up through the hose 15 which, in the case being described, will have a length of substantially forty (40) feet. It will be obvious that the shortest element will extend upward only four (4) feet while the longest element will extend the full length of the flexible hose. Inasmuch as the lead wires extending from the upper end of each element are of heavy copper, thereby having a very low ohmic resistance, the effective member for measuring the average temperature of a liquid, upon immersion of the flexible hose into the liquid, will be that element having a length corresponding to the depth of the liquid, assuming, of course, that the lower end of the hose rests upon the bottom of the tank. Specifically, if the level of the liquid is at the point marked by the line $a$, $a$, the longest element (40 feet) will extend throughout the entire depth of the liquid. On the other hand, if the liquid level is at the point $b$, $b$, the shortest (4 foot) element will extend throughout the entire depth of the liquid and the other, longer elements will extend beyond the liquid surface. The parallel-disposed elements within the flexible hose may be secured together at spaced points as by cord or the tape 17.

To protect the resistance coils and the associated plastic tubing from deterioration by chemical action and also to protect such members from mechanical damage in the event the stored liquid is agitated violently, the ends of the flexible hose 15 are made liquid-tight. The lower end of the hose is brazed or soldered to a pipe coupling 19 which, in turn, is threaded to a pipe nipple 20, the end of the latter being closed by a pipe cap 21. The upper end of the flexible hose likewise is brazed or soldered to a pipe coupling 22 that is threaded on a length of standard pipe 23 having a reducing coupling 24 at the other end. A somewhat larger diameter, standard pipe 25, carrying the flanges 26, is threaded into the other end of the reducing coupling 24. The device illustrated in Figure 4 represents that part of the apparatus going into the oil storage tank and comprises the temperature-sensing section (within the flexible hose) and the necessary accessories for suspending the device as a whole from the top of a storage tank. While we prefer to house the resistance coils in a flexible, metallic hose, it is apparent such housing may comprise a rigid member such as a pipe, tube or etc.

Figure 5 illustrates the device as attached to a conventional, cone-roof, storage tank 30. The flexible hose 15 extends from the bottom of the tank to a point corresponding to the highest level of oil to be contained within the tank. The device is supported from a plate 31, disposed within the hatch 32, by means of the pipe flanges 26. The upper lead wires connected to each of the resistance coils disposed within the flexible hose may be brought to the instrument housing 33 through the pipe 34 that is connected to the pipe 25 by the elbow 35.

Thus, all wires are completely enclosed and protected from the elements. The relatively long pipe 34 may be secured at spaced points as by the pipe hangars 36 welded to the tank. Contained within the housing 33 are the associated electrical components such as the indicating instrument, switch, battery, etc., as will be described hereinbelow.

Figure 6 illustrates the device attached to a pontoon, or floating-roof, type of oil storage tank. In this case the flexible hose extends the full height of the tank 40 to clear the collar 41 that is attached to the hatch 42. The axial hole through the collar 41 is larger than the outside diameter of the metal hose 15, whereby the hose remains in the vertical position as the floating roof 43 moves up or down in response to changes in the level of the contained liquid. An L-shaped bracket 44 serves to support the device in proper position. All wires are enclosed, passing through the elbow 45, pipe 46 supported by the pipe hangar 47 and flanges 48, elbow 49 and pipe 50.

The resistance of the individual coils carried within the flexible hose 15 will vary with the temperature of the oil and known electrical circuits may be employed to provide temperature indications in response to the instantaneous resistance value of a selected coil. One such circuit arrangement is shown in Figure 7, wherein the different length resistance coils are represented by the resistances 51 to 60. The different lengths of these resistances is representative of the different axial lengths of the helical coils, but, as has been pointed out above, all coils are of identical ohmic resistance valve at any given temperature. The lower ends of all the coils are connected together electrically and connection to this common point is made by means of the common lead wire 61 that extends up through the flexible hose and the associated piping. In the circuit diagram the upper limit of the flexible hose is represented by the encircling line $c$. The other end of each coil is connected, by means of the individual lead wires, to separate, stationary contacts of a rotary switch 63 having its movable contact 64 connected to one corner of a Wheatstone bridge 65 by the wire 66. Thus, one end of a selected coil is connected to the bridge through the selector switch 63 while the other end is connected to an adjacent bridge junction by the common lead 61 and the connecting wire 67. Consequently, one arm of the bridge comprises a resistance coil selected by a positioning of the rotary switch blade 64 while the other bridge arms comprise the resistors 68, 69 and 70. Current for the circuit is furnished by a battery 72 or other D. C. source, connected to opposite bridge junctions by the wires 73 and 67 on the one side, and wire 74, current limiting resistor 75 and wire 76 on the other side. An electrical indicating instrument 77 has its movable coil 78 connected across the other bridge junctions, as shown. When the ohmic resistance of the individual resistance coils (represented by the resistance 51 to 60) is equal to that of the bridge resistors 68, 69, 70, the bridge is balanced and no current will flow through the instrument movable coil. When the resistance of the resistance coil changes, due to a change in the temperature of the liquid, or air, surrounding such resistance coil, the bridge becomes unbalanced resulting in a flow of current through the instrument movable coil, causing the pointer 78′ to rotate with respect to a calibrated temperature scale 79, as is well known in the art. The bridge resistor arms, the value of the temperature-sensitive resistance coils and the characteristics of the indicating instrument may be selected so that the pointer will be at a mid-scale position when the temperature of the resistance coils is, say, 70° F. A circuit-checking resistor 80 is connected between a free contact 81 of the rotary switch and the bridge, as by the wire 82. This resistor is adjusted to an ohmic value such that its insertion into the bridge circuit (by rotating the switch blade 64 into contact with the stationary contact 81) will cause the pointer to become aligned with a fixed reference point on the instrument scale, such as, for example, the 70° F. mark. Any deviation of the pointer deflection under this condition will serve as a warning the apparatus is not in proper working order.

The battery, Wheatstone bridge and the selector switch may be located within the housing 33 attached to the exterior tank surface (Figures 5 and 6) or these components may be disposed at some point remote from the storage tank as, for example, a central office. The resistance of the relatively heavy lead wires, connecting the resistance coils with the remotely located bridge circuit and indicating instrument, is very low compared to that of the coils and bridge resistors and, consequently, such lead resistance is not of practical significance with respect to the operating accuracy of the system. To eliminate the variable effect of potential differences between the bridge and the temperature-sensitive resistance coils the battery potential is applied directly to the common lead wire 61 through the connecting wire 73, thereby making the connection formed by the wires 67, 73 and 61 the effective junction of the bridge. In such arrangement the lead wire 67 lies in that arm of the bridge including the resistor 68 while the lead wire 66, the switch blade 64 and the selected lead wire from the switch to the resistance coil, all lie in the adjacent bridge arm.

It will be apparent that when the metal hose carrying the different length resistance coils is attached to an oil tank the temperature of the immersed coils will correspond to that of the oil for the level or levels corresponding to the length of the coil. Specifically, if the oil within the tank has a depth of four (4) feet the resistance coil having a similar length will be at the average temperature of the oil and by connecting this coil to the indicating circuit, by means of the selector switch, a direct reading of the average temperature will be obtained. If the oil depth is twelve (12) feet, connection of the 12 foot long resistance coil will give a direct reading of the average temperature. Similarly, if the tank is full, the 40 foot long resistance coil is employed for obtaining the average temperature throughout the entire oil depth. For intermediate levels of the contained oil the longest, completely immersed coil is selected for the reading. For example, when the depth of the oil is 18 feet, the 16 foot long coil is selected. If, however, the oil depth is 19 feet 10 inches, the 20 foot long resistance coil will give a practical value of the average temperature even though 2 inches of the coil extend above the surface of the oil. These examples apply to the described arrangement wherein 10 coils differing progressively by a length of four (4) feet are employed in conjunction with a 40 foot tank. It will be obvious that a closer relation between the oil level and the coil length may be provided. Specifically, the use of forty (40) coils differing progressively in 1 foot lengths will afford correct readings within one (1) foot levels of the oil.

To facilitate use of the apparatus, the selector switch may be marked in terms indicative of liquid depth. For example, the rotary contact of the switch may be associated with a dial marked "4—8—12 . . . 40"—corresponding to the specific length of the resistance coils, whereupon the operator, after having determined the depth of the liquid in the conventional manner, merely sets the switch blade 64 (Figure 7) to the appropriately-marked depth.

As stated hereinabove, the temperature-sensitive resistance coils may be of identical ohmic resistance and different lengths, whereby the functional characteristics of the electrical circuit remain constant regardless of the particular coil inserted into the circuit through the selector switch. In certain applications it may be desirable to adjust the resistance coils to different ohmic resistance values and to make the necessary compensation by means of resistors inserted into the bridge circuit so that a single indicating instrument may be used. Specifically, the relatively short coils 51 to 55 (Figure 7) may each have an adjusted value of 100 ohms, whereas the longer coils 56 to 60 may have an adjusted resistance of 200 ohms. In this case the selector switch 63 is of the multiple deck type wherein one deck is devoted to altering the resistance of the bridge arms to maintain a predetermined bridge sensitivity throughout the positional range of the movable switch arm 64, as is well known in this art.

Figure 8 illustrates a circuit diagram wherein a ratio meter is employed as the temperature indicator. In such case the instrument has two movable coils 85, 86 connected across the opposite junctions of the bridge. The ratio of the currents flowing in these coils determines the displacement of the pointer 87 with respect to the calibrated temperature scale 88, as is well known. A ratio meter arrangement affords automatic compensation for temperature changes of the air surrounding the bridge and indicating instrument by connection of a resistor 89 between the midpoint of the instrument coils 85, 86 and a junction of the bridge arms. The compensating resistor 89 serves to expand or contract both ends of the instrument scale, a decrease in resistance causing a contraction of the scale to compensate for a corresponding expansion effect due to the simultaneous decreases in the resistance of instrument movable coils.

Figure 9 illustrates another embodiment of the invention wherein the temperature-sensitive resistance coils are connected in series, resulting, in effect, in a single coil disposed within the oil or other liquid. Each of the coils 90–99 are of uniform axial length and such coils are made and housed as described with reference to Figures 1 to 4. The individual coils are connected to the stationary contacts of the rotary selector switch 63' by relatively heavy lead wires. The rotary blade 64' of the selector switch and the top end of the coils are connected to the junctions a, a of the Wheatstone bridge (Figure 8) by the wires 100 and 101. In making a temperature reading the selector switch is set to connect the immersed resistance coils to the measuring circuit. In an arrangement of this type the resistance of the active resistance coils changes with the number of coils connected into the circuit and, consequently, the potential applied to the bridge must be altered correspondingly to permit the use of a single temperature scale on the temperature-indicating instrument. Such arrangements are well known in the electrical resistance thermometry art.

Having now described our invention in detail its many partical advantages will be apparent to those skilled in this art. It is pointed out that our temperature-sensing apparatus may be installed in an oil storage tank without requiring the emptying and degassing of the tank which is a costly operation. The suspension of the complete temperature-sensing apparatus from the top of the tank facilitates not only the installation but also simplifies the removal thereof repair and/or replacement purposes.

The use of helically-wound or pleat-folded resistance coils, each stretched to a predetermined, different axial length, results in production economy as the coils are all formed uniformly regardless of the height of the oil tank in which they are to be used. The flexible tubing encasing the individual coils serves as a convenient means for retaining each coil in the proper, predetermined length, acts as an insulating medium so that a plurality of such coils may be mounted together, and protects the coils from mechanical damage and possible deterioration by chemical fumes.

The use of a flexible metal hose, as shown and described, offers practical advantages with respect to transportation and installation. When the temperature-sensing apparatus is exceptionally long, for use in, say, a 60 foot high tank, the flexible hose may be coiled for practical handling.

The features of our invention are not limited to temperature indicators as it is well known the indicating meter may be replaced by a recorder for providing a continuous record of temperature, or by a control system providing a visual or audible signal upon departure of the average temperature from a predetermined value, or for maintaining the liquid temperature at a desired value.

Various modifications and changes in the individual components and the assembly thereof will suggest themselves to those skilled in the art such modifications and changes being permissible within the scope and spirit of the invention as set forth in the following claims.

We claim:

1. A temperature-sensing unit for use in determining the average temperature of a liquid at predetermined levels thereof, said unit comprising a tubular housing; means for mounting the housing in a substantially vertical position in a liquid reservoir with one end of the housing proximate to the bottom of the reservoir; a plurality of resistance elements axially disposed within the housing, said elements having different linear lengths but equal ohmic resistance values and each element having an end disposed at one end of the said housing; means electrically insulating the resistance elements from each other, a common lead wire extending through the housing and connected to that end of each element disposed at one end of the housing; and individual lead wires extending from the housing and individually connected to the other ends of each element.

2. The invention as recited in claim 1 wherein the resistance elements comprise helical coils and the means insulating the coils from each other comprises individual flexible tubes of insulating material surrounding each coil.

3. The invention as recited in claim 2, wherein the tubular housing is a flexible, metallic hose.

4. Apparatus for determining the average temperature of a liquid throughout a predetermined level thereof, said apparatus comprising a tubular housing; means for mounting the housing in a substantially vertical position in a liquid reservoir with one end of the housing proximate to the bottom of the reservoir; a plurality of helical resistance coils axially disposed within the housing, said coils having different axial lengths but equal ohmic resistance values and each coil having an end disposed at the lower end of the said housing; a common lead wire connected to the lower ends of all said coils and passing upwardly through the housing; individual lead wires connected to the other ends of each coil and passing upwardly through the housing; temperature-indicating means connected to the said common lead wire; and manually-operable means for connecting the said temperature-indicating means to a selected one of said individual lead wires.

5. The invention as recited in claim 4, wherein the said housing comprises a flexible metallic hose and said resistance coils are enclosed in individual, flexible tubes of insulating material.

6. Apparatus for determining the average temperature of a liquid throughout a predetermined depth thereof, said apparatus comprising a tubular housing including means for mounting the housing in a substantially vertical position in a liquid reservoir with one end of the housing proximate to the bottom of the reservoir; a plurality of helical resistance coils axially disposed within the housing, said coils having different axial lengths but equal ohmic resistance values and each coil having an end disposed at the lower end of said housing; a resistance bridge; a source of voltage connected across one set of opposed bridge junctions; an indicating instrument having a scale calibrated in temperature values and connected across the other set of opposed bridge junctions; a selector switch having a movable contact and a set of cooperating stationary contacts; leads individually connecting the said stationary switch contacts to the upper ends of the said resistance coils; a lead connecting the said movable switch contact to one bridge junction; and a lead connecting the lower ends of all resistance coils to an adjacent bridge junction.

7. The invention as recited in claim 6, wherein the said housing comprises a flexible metallic hose and said resistance coils are enclosed in individual flexible tubes of insulating material.

8. A sealed electrical unit comprising a hollow tube made of a pliable plastic material, an electrical element disposed loosely in the tube, and lead wires having a pliable-plastic insulation covering and extending from each end of the tube, said wires each having an inner end connected to the electrical element and said tube having its ends heat sealed to the covering on the lead wires.

9. The invention as recited in claim 8, wherein the electrical element is a resistance wire having a relatively high temperature coefficient of resistance.

10. The invention as recited in claim 9, wherein the resistance wire is in the form of a normally unsupported helix.

11. A temperature-sensing device for use in determining the average temperature of a medium through-out different levels thereof taken from a reference level, said device comprising a plurality of resistors having different linear lengths but equal resistance, one end of each of said resistors being insertable into the medium at the reference level and the other resistor ends terminating at different levels; and leads connected to the ends of the resistors and extending outwardly of the medium for connecting a selected resistor in an electrical circuit.

12. A temperature-sensing device for use in determining the temperature throughout different levels of a liquid contained in a tank, said device comprising a plurality of resistors having equal resistance and different linear lengths, one end of each of said resistors being connected together and inserted into the liquid at a reference level and the other resistor ends terminating at different levels; and leads connected to the ends of the resistors and extending outwardly of the tank for connecting selected resistors in an electrical circuit.

13. Apparatus for determining the average temperature of a liquid of variable level contained in a tank, said apparatus comprising a plurality of resistors having equal resistance, said resistors extending upwardly from the bottom of the tank and terminating at different levels; an electrical circuit including a temperature indicating instrument and a source of electrical energy; and means including leads connected to the ends of the resistors for connecting a selected resistor in the electrical circuit.

14. The invention as recited in claim 13, wherein one of the said leads is connected to the bottom end of each resistor.

References Cited in the file of this patent

UNITED STATES PATENTS

| Number | Name | Date |
| --- | --- | --- |
| 1,264,681 | Ranken | Apr. 30, 1918 |
| 1,359,400 | Lightfoot | Nov. 16, 1920 |
| 1,364,080 | Davisson | Jan. 4, 1921 |
| 1,770,000 | Kuhlman | July 8, 1930 |
| 2,035,911 | Mucher | Mar. 31, 1936 |
| 2,052,533 | Pender | Aug. 25, 1936 |
| 2,211,606 | Pratt | Aug. 13, 1940 |

FOREIGN PATENTS

| Number | Country | Date |
| --- | --- | --- |
| 531,569 | Great Britain | Jan. 7, 1941 |